J. BROWN.
JAW TRAP.
APPLICATION FILED JAN. 22, 1920.
1,366,355.
Patented Jan. 25, 1921.
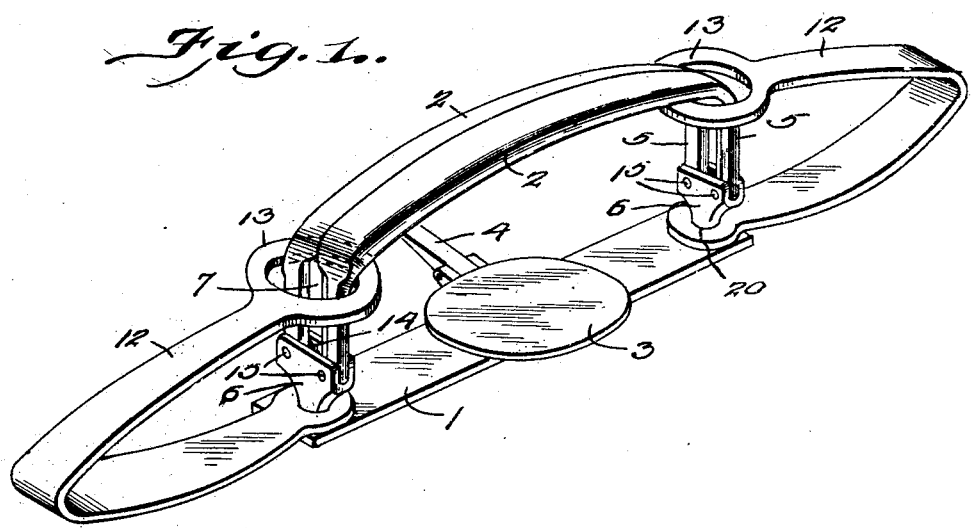
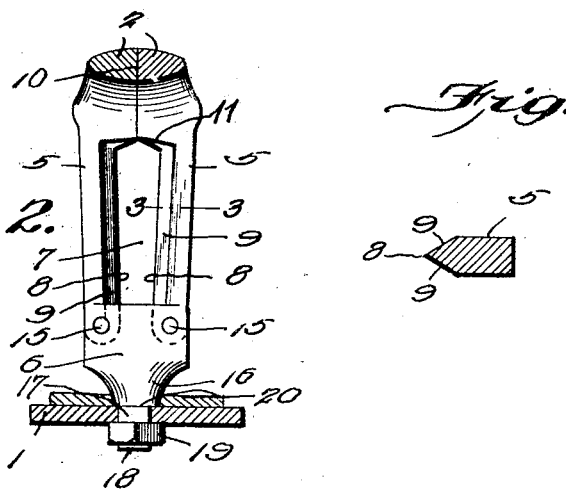
Inventor:
John Brown,
Witness
By
Attorney.

UNITED STATES PATENT OFFICE.

JOHN BROWN, OF ROUND MOUNTAIN, CALIFORNIA.

JAW-TRAP.

1,366,355.          Specification of Letters Patent.      Patented Jan. 25, 1921.

Application filed January 22, 1920. Serial No. 353,227.

*To all whom it may concern:*

Be it known that I, JOHN BROWN, a citizen of the United States, residing at Round Mountain, in the county of Shasta and State of California, have invented new and useful Improvements in Jaw-Traps, of which the following is a specification.

This invention relates to animal traps, and particularly to steel traps of the spring-jaw-type.

Heretofore traps of this type have been provided with jaws having posts or legs which are pivoted to the base plate and which are either set very close together in order to allow the gripping surfaces of the jaws to close tightly about a very small object, or, in order to secure this result, the jaws must be made comparatively wide and the end posts or legs tapered in order to allow the biting edges to come closely together when the jaws are closed. Such constructions have been found objectionable, for the reason that the end posts or legs are necessarily spaced such a slight distance apart that sticks, stones and other objects frequently become lodged between the same, thus preventing the jaws from closing tightly when the trap is sprung. Attempts have been made to overcome this objection by making the short end posts straight and vertical and spacing them as far as possible apart, but such attempts have been ineffectual toward a satisfactory solution owing to structural obstacles, such as a pronounced curvature of the jaws or shortness of the end posts, making it impractical to space the end posts a sufficient distance apart to prevent large sticks, stones and other objects from interfering with the tight closing of the jaws. As a result, trapped animals are frequently lost because the jaws will not close sufficiently tight to hold them.

One object of my invention is to provide trap jaws of such construction as to insure a tight closing of the jaws even in the event that foreign substances of some considerable size may enter between the sets of end posts or legs.

Another object is to provide jaws which may be applied to any ordinary style or make of trap.

The invention consists of the features of construction, combination and arrangement of parts, hereinafter fully described and claimed, reference being had to the accompanying drawing, in which:—

Figure 1 is a perspective view of a trap embodying my invention, omitting the trigger mechanism.

Fig. 2 is a cross section through the trap.

Fig. 3 is a detail section on line 3—3 of Fig. 2.

In the accompanying drawing I have shown my invention applied to one type of trap body, but it is to be understood that the jaws may be applied to any form of spring-jaw-trap by simply varying the construction of the mountings, as hereinafter described.

Referring to the drawing, 1 designates a base plate, 2 the trap jaws, and 3 the bait-pan, said pan being connected with an element 4 of the trigger mechanism, not shown in detail and which may be of any ordinary or preferred construction.

The jaws 2 are gently curved, or extend on an arc of a circle of comparatively wide radius, in a longitudinal direction, and said jaws are provided with and supported at their ends by upright end pieces or legs 5. The opposed pairs of legs supporting like ends of the jaws are arranged in transverse alinement, and said legs are pivotally connected with the base plate, as indicated at 6, to permit a swinging motion of the jaws to open and closed positions.

Owing to the gentle arc of curvature of the jaws 2 the legs 5 may be made comparatively long and straight, so that when the jaws are closed the legs will stand in a vertical plane. Hence the transversely alined legs of each pair may be spaced a considerable distance apart, and the gap or space 7 between adjacent legs may extend the full length of the legs. This construction also permits the inner edges 8 of the legs to be made straight and parallel with their axes. These edges 8 are tapered to knife edges by beveling the sides of the legs, as indicated at 9, each leg being thus of substantially triangular form in cross section.

The jaws 2 have clamping faces 10 the end portions of which are beveled where they intersect the edges 8, as indicated at 11. Spring arms 12, carried by the base plate 1, have looped ends 13 slidably engaging the respective pairs of legs, and such looped ends operate in an obvious manner to permit opening movement of the jaws in setting the trap and in closing the jaws automatically when the trap is sprung.

It will be observed that by the described form and arrangement of the legs 5, the clearance spaces 7 between the adjacent legs extend the full length of the legs, and by the provision of the beveled surfaces 11 extend the full depth between the base plate 1 and the clamping surfaces of the jaws 2. Hence these spaces may be wide and deep enough to accommodate small sticks, stones, gravel and other foreign objects without interfering with the swinging movements of the legs and closing action of the jaws. If a stone, small branch of a tree or other object of substantially the same diameter as the space between the edges 8 of adjacent legs should lodge between the legs, in such event the said biting edges 8, under the action of the closing jaws, may break or cut into the object sufficiently to permit the jaws to fully close. It is well known that traps of the type disclosed are liable to be rendered ineffective by objects entering betwen the legs or pivoted ends of the jaws and preventing the jaws from closing fully and holding the entrapped animal, many animals being lost in this manner. My invention overcomes this objection, as the construction described provides for the accommodation of objects of considerable size between the legs of the jaws without interfering with the closing movement of the jaws, thus rendering the trap more positive and effectual when sprung.

It is to be understood that while I have shown the jaws applied, in the present instance, upon a particular type of trap body, employing bracket members 6 for this purpose, other constructions of mountings or bracket members may be employed to render the jaws adaptable upon any make or style of trap in common use. In the example shown the bracket members 6 are grooved or bifurcated as at 14 to receive the lower ends of the posts 5 which are pivoted therein, as indicated at 15, and said bracket members 6 are provided with shanks 16 having reduced angular portions 17 to fit within angular openings in the base plate 1, said angular portions terminating in threaded circular portions 18 to receive clamping nuts 19. At the juncture of the portions 16 and 17 a shoulder 20 is provided to bear upon the upper surface of the base plate, so that when the nut is tightened the bracket member 6 will be firmly clamped in position.

Having thus fully described my invention, I claim:—

1. A jaw-trap including a base plate, jaw-actuating means carried by the base plate, a pair of jaws, and pairs of straight end posts or legs pivotally connecting the ends of the jaws with the base plate, the end posts or legs of each pair being spaced apart throughout their length so as to lie in substantially parallel planes when the jaws are closed, and said jaws having biting edges extending inwardly beyond the inner edges of the legs and in alinement medially of the opposed faces thereof.

2. A jaw-trap including a base plate, jaw-actuating means carried by the base plate, a pair of jaws, and pairs of straight end posts or legs pivotally connecting the ends of the jaws with the base plate, the end posts or legs of each pair being equidistantly spaced throughout their length so as to lie in substantially parallel planes when the jaws are closed, said end posts having their sides oppositely tapering to form inner cutting edges, extending in alinement medially of the opposed faces thereof.

3. In a jaw-trap, the combination of a pair of jaws having depending end posts or legs, arranged in parallel and relatively wide spaced relation when the jaws are in closed position, said legs having their inner surfaces oppositely beveled to knife edges, and the ends of the jaws being provided with beveled portions connecting the upper ends of said knife edges, and members pivotally supporting said jaws and adapting the same for application to a trap body.

In testimony whereof I affix my signature.

JOHN BROWN.